(12) United States Patent
Mihira (10) Patent No.: US 8,705,069 B2
(45) Date of Patent: Apr. 22, 2014

(54) IMAGE PROCESSING APPARATUS STORING IMAGE DATA TO BE REFERENCED AND METHOD FOR CONTROLLING THE SAME

(75) Inventor: Yoshiro Mihira, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 13/247,267

(22) Filed: Sep. 28, 2011

(65) Prior Publication Data
US 2012/0086976 A1 Apr. 12, 2012

(30) Foreign Application Priority Data
Oct. 8, 2010 (JP) ................................. 2010-228302

(51) Int. Cl.
*G06K 15/00* (2006.01)
*H04L 29/06* (2006.01)

(52) U.S. Cl.
USPC .......... 358/1.14; 358/1.13; 358/1.15; 399/66; 399/79; 713/165

(58) Field of Classification Search
USPC ................... 358/1.15, 1.14, 1.13; 399/79, 66; 713/182–186, 166; 700/244, 245, 246, 700/257
See application file for complete search history.

(56) References Cited

U.S. PATENT DOCUMENTS

| 7,587,460 | B2 * | 9/2009 | Saito ............................. 709/207 |
| 7,693,185 | B1 * | 4/2010 | Brown et al. ................. 370/474 |
| 8,368,936 | B2 * | 2/2013 | Teramoto et al. ............ 358/1.15 |
| 2006/0069756 | A1 * | 3/2006 | Singh et al. ................... 709/220 |

FOREIGN PATENT DOCUMENTS

JP 2006-293833 A 10/2006

* cited by examiner

*Primary Examiner* — Dennis Dicker
(74) *Attorney, Agent, or Firm* — Canon USA, Inc., IP Division (57) ABSTRACT

An image processing apparatus may include a storage unit, a generation unit, a recording unit, and a transmission unit. The storage unit is managed to allow access from an external information processing apparatus. The generation unit generates image data for audit for auditing the image data later. The image data is generated by a reading unit reading a document or is input. The recording unit records the image data for audit generated by the generation unit. The transmission unit transmits, to the external information processing apparatus, information about the image data in which the image data for audit is recorded by the recording unit among the image data stored in the storage unit in a case where a request for referring to the storage unit is received from the external information processing apparatus.

5 Claims, 9 Drawing Sheets

| NAME OF DATA COMPONENTS | EXAMPLE |
|---|---|
| 41 ~ NAME OF IMAGE DATA | Scan-20091211-130141.pdf |
| 42 ~ INFORMATION ON ACTUAL DATA STORAGE POSITION | 1222232313 |
| 43 ~ SIZE OF IMAGE DATA | 1,303,444 Bytes |
| 44 ~ IMAGE DATA UPDATE TIME | 2009/12/11 14:31:21 |
| 45 ~ ACCESS RIGHT | Write=mihira,Read=any |
| 46 ~ ARCHIVED FLAG | 1 |

FIG. 5

| MY COMPUTER | | |
|---|---|---|
| FILE (F) EDIT (E) VIEW (V) HELP (H) | | |
| ADDRESS | EDIT (E)¥¥mfp-1¥share¥ | |
| NAME | SIZE | UPDATE DATE AND TIME |
| Scan-20091211-130141.pdf | 1.1M | 2009/12/11 13:01 |
| Scan-20091212-101011.pdf | 10.2M | 2009/12/12 10:10 |

IMAGE PROCESSING APPARATUS STORING IMAGE DATA TO BE REFERENCED AND METHOD FOR CONTROLLING THE SAME

BACKGROUND OF THE INVENTION

1. Field of the Invention

The present invention relates to an image processing apparatus storing image data to be referenced by an information processing apparatus and a method for controlling the same.

2. Description of the Related Art

An image processing apparatus including a nonvolatile storage device, a hard disk drive (HDD), for example, has been put into practical use. In such an image processing apparatus, there has been provided a function of storing image data in a format such as a portable document format (PDF), for example, which is easy for a personal computer (PC) to handle, as a format for storing scanned image data in a HDD (hereinafter referred to as an image storage function).

A storage function is provided with a function of using image data such as a PDF stored from an external PC or another image processing apparatus in an image processing apparatus (hereinafter referred to as file sharing function) in order for an image processing apparatus (PC) to easily use image data stored in the image processing apparatus.

On the other hand, a job archive application for recording the input and output of data including the image data of the image processing apparatus has been provided as another function of the image processing apparatus.

The job archive application refers to the one that records image data for archive used for inputting and outputting and auditing the image data of the image processing apparatus. The image data is recorded in a memory such as a HDD in the image processing apparatus or recorded in an external server.

The input and output of the image data of the image processing apparatus can be audited using the recorded image data for archive by an audit application separately operating on a server. If information leaks out, a user handling the information can be identified using the audit application.

Japanese Patent Application Laid-Open No. 2006-293833 discusses a technique in which the combination of the job archive application of the image processing apparatus and the audit application allows providing a function of prohibiting abuse of information from a standpoint of security using the image processing apparatus.

A conventional job archive application, however, records the input and output of image data associated with the execution of a job in a case where the image processing apparatus executes jobs such as a copy, a print, or an image transmission. However, in a case where image data is input and output independent of the execution of the job, the conventional job archive application may not be able to record image data for archive.

For example, it is presumed that a removable memory such as a universal serial bus (USB) memory can be attached to the image processing apparatus. If a copy of image data stored in the USB memory is formed in the HDD in the image processing apparatus (file copy), and if the image processing apparatus does not handle such a filing operation as a job, the image data for archive is not recorded in spite that image data is input to the HDD. For this reason, the audit performed later cannot identify who inputs the image data stored in the HDD and how the image data is input.

For example, if the image data received by the facsimile (FAX) reception function of the image processing apparatus is stored in the HDD using a data transfer function inside the image processing apparatus, image data for archive at the time of FAX reception is recorded, however, the image data for archive related to the image data stored in the HDD are not recorded. Consequently, the audit performed later cannot identify who inputs the image data stored in the HDD and how the image data is input.

On the other hand, there is a method for generating the image data for archive used for audit of the image data generated by an operation regarding the image data such as writing into or change of all image storage functions.

In a case where the image data for archive used for audit is generated, an external PC needs to generate all image data for archive used for audit even if all or a part of image data is changed. This causes a new problem that the image data for archive used for audit are enormously increased to bear down the storage capacity of the HDD.

SUMMARY OF THE INVENTION

The present invention provides a mechanism in which image data from which image data for audit is generated is discriminated from other image data when an information processing apparatus refers to image data stored in a externally shared storage device and an information processing apparatus is notified of only a list of the image data from which image data for audit are generated.

According to an aspect of the present invention, an image processing apparatus includes: a storage unit configured to be managed to allow access from an external information processing apparatus; a generation unit configured to generate image data for audit for auditing the image data later, wherein the image data is generated by a reading unit reading a document or is input; a recording unit configured to record the image data for audit generated by the generation unit; and a transmission unit configured to transmit, to the external information processing apparatus, information about the image data in which the image data for audit is recorded by the recording unit among the image data stored in the storage unit in a case where a request for referring to the storage unit is received from the external information processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

It is to be understood that the components described in the following exemplary embodiments are merely examples and that the scope of the invention is not limited only to these examples.

Figure 1:
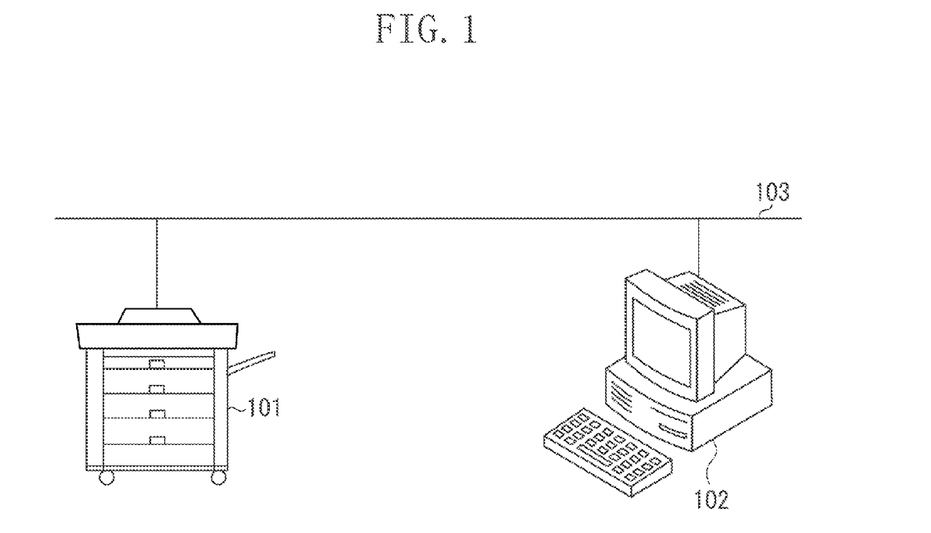
FIG. 1 illustrates an example of an image processing system to which an image processing apparatus is applied.

FIG. 1 illustrates an example of an image processing system to which an image processing apparatus according to a first exemplary embodiment is applied. Although the figure exemplifies that the system is formed by connecting one PC client to one image processing apparatus, the system may be the one that a plurality of personal computers (PCs) can use a plurality of image processing apparatus.

In the present exemplary embodiment, a multifunction peripheral (MFP) is used as the image processing apparatus. The image processing apparatus of the present exemplary embodiment provides a file share function service for the image data stored in a memory according to an external release request from an information processing apparatus. In other words, the image processing apparatus of the present exemplary embodiment includes a function in which the information processing apparatus manages a storage unit (or a hard disk drive (HDD) described below) for storing image data in such a manner that the information processing apparatus can share the storage unit outside.

In FIG. 1, an image processing apparatus 101 can be used by a PC client 102 via a network 103. The image processing apparatus 101 has an archive function to store the image data input and output by the image processing apparatus 101 in a server (not illustrated) for the purpose of audit performed later. An audit application operating on the server can audit the image data input and output by the image processing apparatus 101.

The PC client 102 is also an information processing apparatus which accesses the file sharing function of the image processing apparatus 101 using a predetermined protocol such as a distributed authoring and versioning protocol for the World Wide Web (WWW) (Web-based Distributed Authoring and Versioning (WebDAV)) and a service message block (SMB). World Wide Web is a system of interlinked hypertext documents accessed via the Internet and Web-based Distributed Authoring and Versioning is a set of methods based on the Hypertext Transfer Protocol (HTTP) that facilitates collaboration between users in editing and managing documents and files stored on World Wide Web servers. A service or server message block operates as an application-layer network protocol that is used to provide shared access to files, printers, serial ports, and miscellaneous communications between nodes on a network.

The network 103 is the one to which the image processing apparatus 101 and the PC client 102 are connected. The network 103 is an Ethernet (registered trademark) network, for example, which realizes a local area network (LAN) connection.

Figure 2:
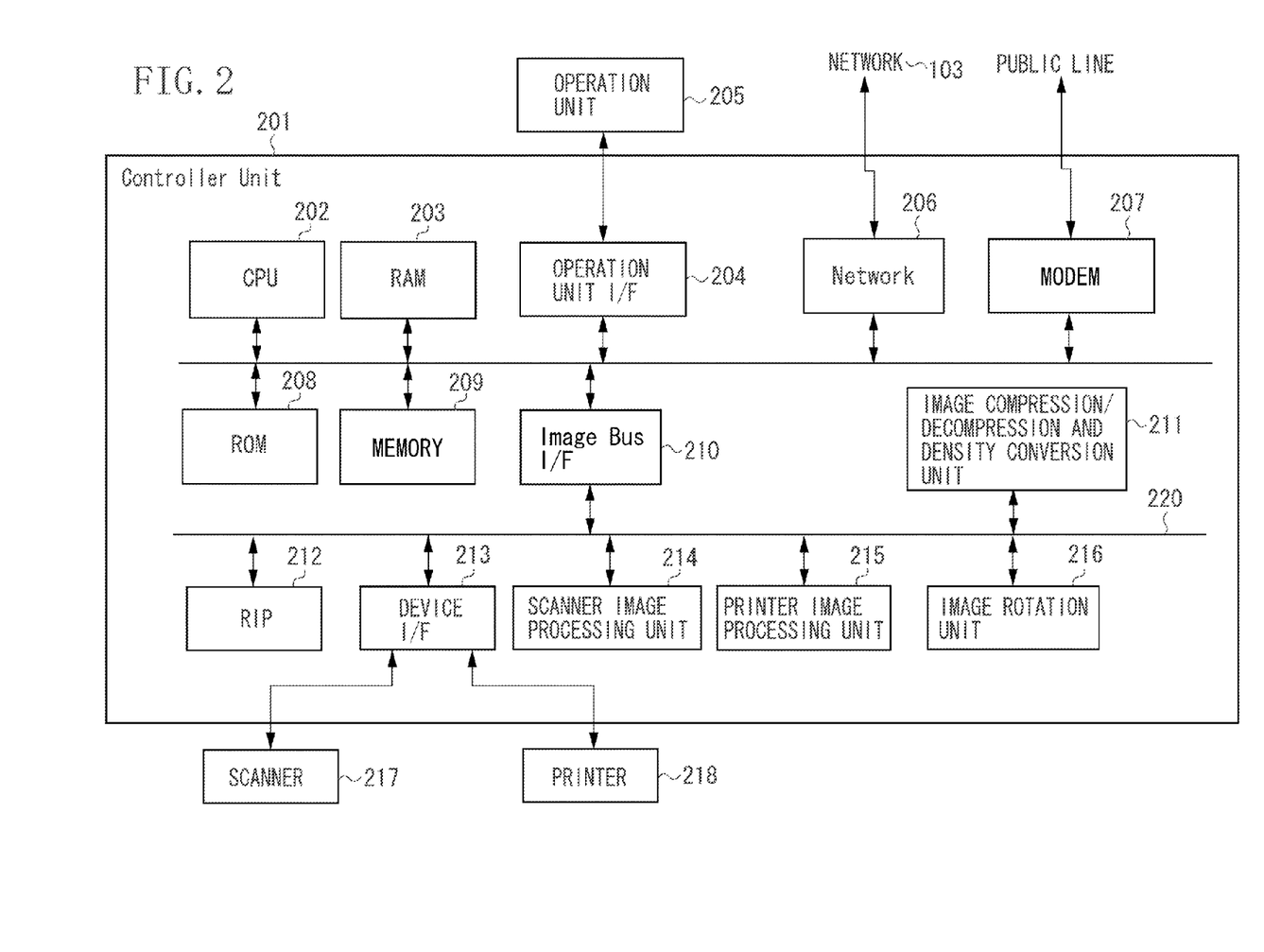
FIG. 2 is a block diagram illustrating the outline of a hardware configuration of the image processing apparatus.

FIG. 2 is a block diagram illustrating an outline of a hardware configuration of the image processing apparatus 101 illustrated in FIG. 1.

In FIG. 2, a controller unit 201 is connected with a scanner 217 being an image input apparatus for reading image data such as a document and inputting the image data, and a printer 218 being an image output apparatus.

The controller unit 201 communicates with the PC client 102 illustrated in FIG. 1 via the network 103. The controller unit 201 controls the input and output of image data and device information.

A central processing unit (CPU) 202 is a controller for controlling the entire system in the image processing apparatus 101 illustrated in FIG. 1. A random access memory (RAM) 203 is a system work memory for operating the CPU 202 and an image memory for temporarily storing image data. A read only memory (ROM) 208 is a boot ROM which stores a boot program for booting the system of the image processing apparatus 101.

A memory 209 is comprised of a hard disk drive in the image processing apparatus 101. The memory 209 stores system software, application software, and image data illustrated in FIG. 3. The memory 209 can store the first and second image data described below.

The second image data is image data or document data (including a portable document format (PDF) file) stored in a universal serial bus (USB) memory, for example, as an external storage unit, and is input to the image processing apparatus 101 via a USB interface (I/F) (not illustrated). Facsimile image data received by a modem 207 is also included in the second image data.

A storage area for storing the image data used for the file sharing function is secured for an area for storing image data in the memory 209. The memory 209 also secures a storage area for storing image data for archive which record the input and output of image data in the image processing apparatus 101. The memory 209 is comprised of a hard disk drive (HDD) or a solid state drive (SSD).

In the present exemplary embodiment, the image data for archive corresponds to image data for audit for auditing image data, and is formed when image data read by the scanner 217 is stored in the memory 209. The image data read by the scanner 217 is referred to as first image data.

In the present exemplary embodiment, for example, facsimile image data received by the modem 207, image data stored in a USB memory connected with the USB I/F (not illustrated), and document data (including a PDF file) are referred to as second image data.

In the present exemplary embodiment, for the second image data, image data for audit is not generated to restrict the capacity of the second image data stored in the memory 209. Thereby, all the image data for audit in the second image data do not need to be stored in the memory 209 to allow the image data read by the scanner 217 to be effectively stored in the memory 209.

The image data for audit is the one that the image data read by the scanner 217 is subjected to image processing such as resolution conversion. Information in which log information is associated with the image data for audit is stored in the memory 209 as history information. The image data for audit is transmitted to a server (not illustrated) via the network 103 at a predetermined timing.

An operation unit interface (I/F) 204 is an interface unit with an operation unit 205, and outputs image data to be displayed on the operation unit 205 to the operation unit 205.

The operation unit I/F 204 has a function to transmit information input by the user of the image processing apparatus 101 via the operation unit 205 to the CPU 202. A network interface (I/F) 206 is connected to the network 103 and inputs and outputs information.

A modem 207 is connected to a public line (not illustrated) and inputs and outputs information. The above devices are arranged on a system bus 219. An image bus interface (I/F) 210 is a bus bridge for converting data structure and is connected with the system bus 219 and an image bus 220 for transferring image data at a high speed.

On the image bus 220 are arranged a raster image processor (RIP) 212, a device interface (I/F) 213, a scanner image processing unit 214, a printer image processing unit 215, an image rotation unit 216, and an image compression/decompression and density conversion unit 211.

The RIP 212 analyzes a page description language (PDL) code to rasterize a bit map image on the RAM 203. The device interface (I/F) 213 connects the scanner 217 and the printer 218 with the controller unit 201.

The scanner image processing unit 214 subjects image data input from the scanner 217 to correction, processing, and editing. The scanner image processing unit 214 has a function to convert the read image data into data in the PDF format, for example.

The printer image processing unit 215 subjects image data to be output to the printer 218 to print correction and resolution conversion. The image rotation unit 216 rotates image data. The image compression/decompression and density conversion unit 211 converts multivalued image data into joint photographic experts group (JPEG) data, and subjects binary image data to compression/decompression processing of joint bi-level image experts group (JBIG), modified modified READ (MMR), or modified Huffman (MH).

Figure 3:
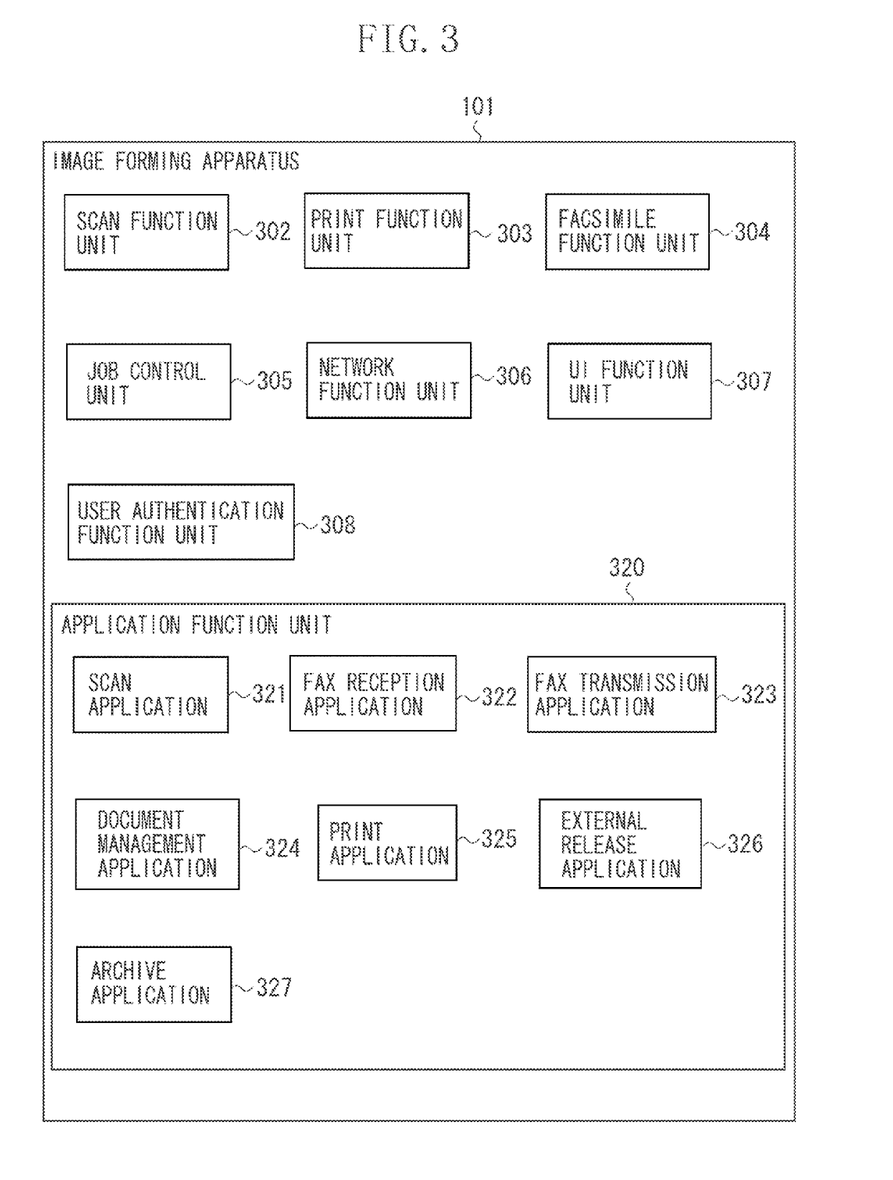
FIG. 3 is a block diagram illustrating a software function of the image processing apparatus.

FIG. 3 is a block diagram illustrating a software function of the image processing apparatus 101 illustrated in FIG. 1. Each of the software 302 to 308 and 320 to 327 in FIG. 3 is stored in the memory 209 in FIG. 2, and executed by the CPU 202.

A scan function unit 302 executes scan function processing using the scanner 217, reads a paper document, and converts the data into binary or multivalued image data. A print function unit 303 outputs the image data, which is previously read by the scan function unit 302 and converted into image data, to the printer 218 with a command for the printer 218 added thereto.

A facsimile function unit 304 subjects the image data, which are previously read by the scan function unit 302 and converted into image data, to coding process according to facsimile standards such as Group 3 and 4 protocols. The facsimile function unit 304 performs image communication with an external facsimile apparatus in accordance with the protocol conforming to facsimile standards using the modem 207. Furthermore, the facsimile function unit 304 transmits and receives facsimile image data to and from an external facsimile via the modem 207 according to facsimile standards.

A job control unit 305 queues image data received from the scan function unit 302 and facsimile image data which the facsimile function unit 304 receives from the outside as a print job. The job control unit 305 appropriately outputs image data to the print function unit 303, the facsimile function unit 304, and a network function unit 306 described later.

The network function unit 306 includes various network protocol functions such as transmission control protocol/internet protocol (TCP/IP), hypertext transfer protocol (HTTP), file transfer protocol (FTP), lightweight directory access protocol (LDAP), simple network management protocol (SNMP), simple mail transfer protocol (SMTP), secure sockets layer (SSL), and server message block (SMB). The network function unit 306 performs a file sharing protocol process in accordance with the SMB from the PC client 102 via the network I/F 206, for example.

A user interface (UI) function unit 307 manages the operation unit of the image processing apparatus 101. The UI function unit 307 displays an input field and an output message field on the operation unit 205, receives an input value for the input field from the user, and notifies other function units of the input value. The UI function unit 307 displays message for the user from other function units on the operation unit 205.

A user authentication function unit 308 authenticates the user who operates various functions of the image processing apparatus 101 using user authentication information in response to a user authentication request for various applications in an application function unit 320.

Units operated by the user are the UI function unit 307 and the PC client 102. User authentication is realized by using a user authentication server (not illustrated) or user authentication information (not illustrated) in the image processing apparatus 101.

The application function unit 320 installs, executes, and uninstalls various applications operating on the image processing apparatus 101. A scan application 321 is one of the applications of the image processing apparatus 101 operating on the application function unit 320.

The scan application 321 performs the scan operation of a document using the scan function unit 302 and the scanner 217 in response to a scan request from the user via the operation unit 205. The scan application 321 stores the read image data in a document management area secured on the memory 209 managed by a predetermined document management application 324.

A FAX reception application 322 is one of the applications of the image processing apparatus 101 operating on the application function unit 320. The FAX reception application 322 prints image data received by the facsimile function unit 304 by the printer 218 using a print application 325, and stores the image data in the document management area of the predetermined document management application 324.

A FAX transmission application 323 is one of the applications of the image processing apparatus 101 operating on the application function unit 320. The FAX transmission application 323 performs the scan operation of a document using the scan function unit 302 and the scanner 217 in response to a scan request from the user via the operation unit 205.

The FAX transmission application 323 transmits the read image data to a predetermined transmission destination using the facsimile function unit 304. The document management application 324 is one of the applications of the image processing apparatus 101 operating on the application function unit 320.

The document management application 324 manages the image data stored in the memory 209 of the image processing apparatus 101 by the scan application 321. The document management application 324 has a management table with a data structure illustrated in FIG. 4, and manages stored image data.

Figure 4:
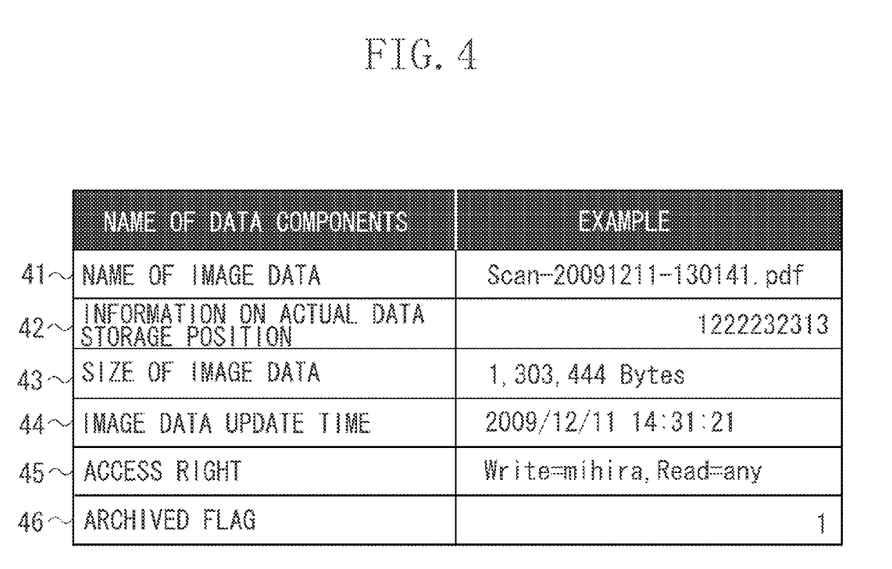
FIG. 4 illustrates a management table managed by a document management application.

FIG. 4 illustrates an example of the management table managed by the document management application 324 illustrated in FIG. 3.

In FIG. 4, an image data name 41 is used for referring to image data. An actual data storage position information 42 indicates storage position information on the memory 209. An image data size 43 refers to the size of image data. An image data update time 44 refers to time at which the image data are updated. An access right 45 indicates whether the user has a right of writing into the image data and reading the image data based on the user information of the user authentication function unit 308.

The example of FIG. 4 shows that only a user "mihira" has write right and all users have read right. An archived flag 46 indicates whether each of image data is already archived by an archive application 327.

As illustrated in the example of FIG. 4, if "1" is entered in the archived flag 46, it means that the image data is already archived. On the other hand, if "0" is entered in the archived flag 46, it means that the image data is not archived.

The print application 325 is one of the applications of the image processing apparatus 101 operating on the application function unit 320. The print application 325 is the one that has a function to print the image data managed by the document management application 324 and the image data on another collaborating image processing apparatus 101.

A file sharing application 326 is one of the applications of the image processing apparatus 101 operating on the application function unit 320. The file sharing application 326 provides a function to read the data stored in the document management application 324 from the PC client 102 or another collaborating image processing apparatus (realized by the SMB or the WebDAV).

The file sharing application 326 provides a function to write and store the data from the PC client 102 or another collaborating image processing apparatus. The PC client 102 accesses the file sharing function of the image processing apparatus 101 using a function such as an SMB client being one of the network functions of the PC client 102.

Figure 5:
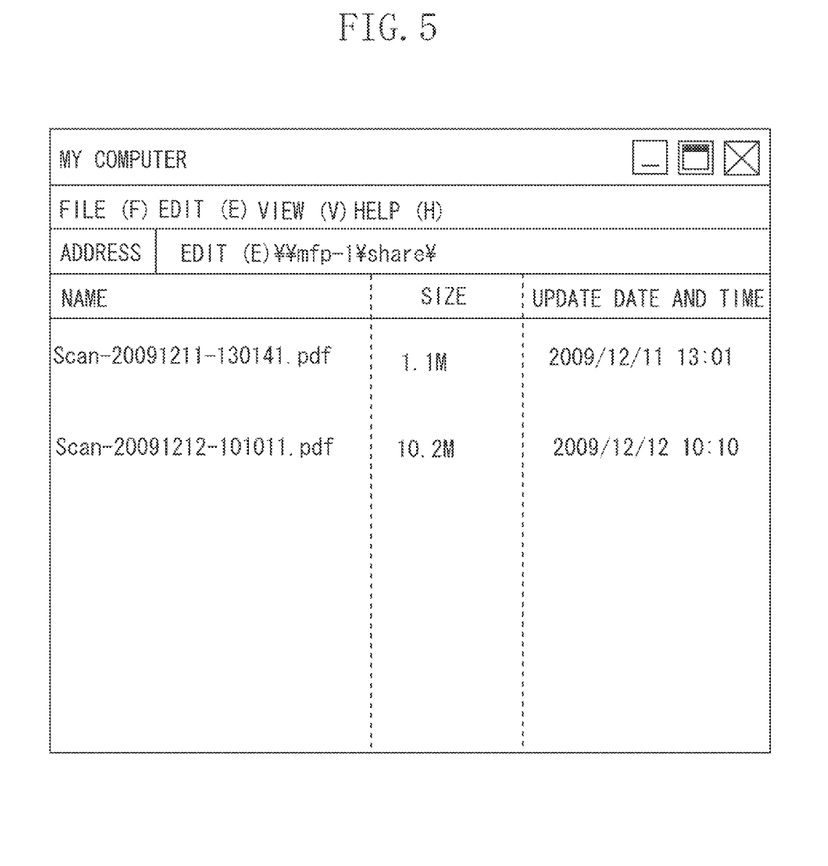
FIG. 5 illustrates an image data selection screen to be displayed on an information processing apparatus.

More specifically, if the name of the image processing apparatus 101 on the network is "mfp-1" as illustrated in FIG. 5, the PC client 102 accesses the image processing apparatus 101 using a name of "¥¥mfp-1¥share," for example. The term "share" refers to a folder in the memory 209 released using the file sharing function.

Thus, the PC client 102 can access the image data stored by the image processing apparatus 101 in the memory 209 using the file sharing function provided by the image processing apparatus 101 as illustrated in FIG. 5.

The archive application 327 is one of the applications of the image processing apparatus 101 operating on the application function unit 320. The archive application 327 has a function to record the image data input or output by the image processing apparatus 101. The archive image recorded by the archive application 327 is transmitted to a server (not illustrated) and audited by the audit application operating on the server.

In the present exemplary embodiment, even if second image data is stored in the memory 209, a list related to the second image data is not displayed on the UI screen of the PC client 102 (information processing apparatus) illustrated in FIG. 5.

More specifically, even though the PC client 102 accesses the image processing apparatus 101 to refer to the file which the image processing apparatus 101 externally releases, the list related to the first image data stored in the image processing apparatus 101 is displayed on the display screen (FIG. 5) of the PC client 102.

This can prevent the image data not archived by the archive application 327 from being transmitted outside the image processing apparatus 101.

Collaboration between the archive application 327 and the file sharing application 326 in the image processing apparatus 101 using the archived flag is described below with reference to a flow chart.

Figure 6:
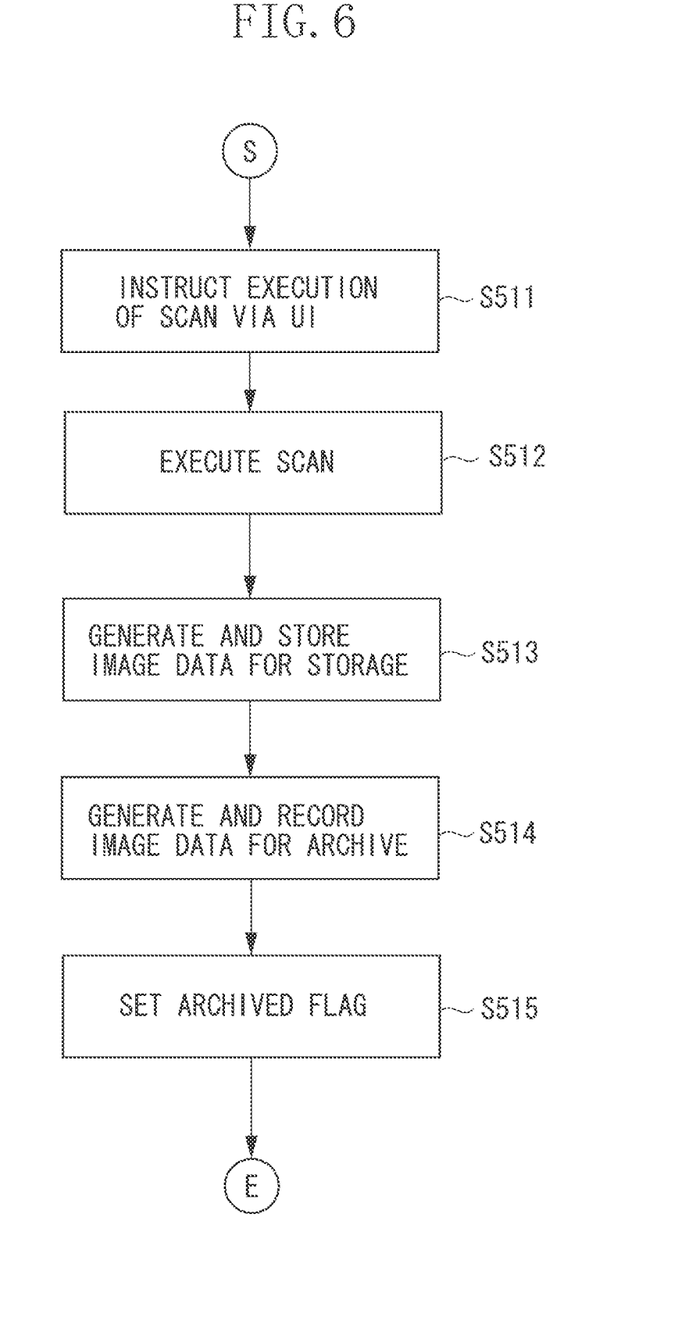
FIG. 6 is a flow chart illustrating a control procedure of the image processing apparatus.

FIG. 6 is a flow chart illustrating a control procedure of the image processing apparatus according to the present exemplary embodiment. The flow chart illustrates an example of control at the time of executing the scan function by the scan application 321 in the image processing apparatus 101. Each step can be realized by the CPU 202 loading the control program to the RAM 203 and executing the control program.

The user instructs the image processing apparatus 101 to start the scan operation using the operation unit 205. In step S511, the scan application 321 operating on the controller unit 201 receives an instruction for executing scan from the user via the operation unit 205.

In step S512, the scan application 321 scans a document using the scan function unit 302. In step S513, the scan application 321 receives image data for storage from the scan function unit 302, and stores the image data in the document management application 324.

In step S514, the scan application 321 generates image data for archive, and stores the image data in the memory 209. The scan application 321 notifies the archive application 327 that the image data for archive is generated.

The scan application 321 requests the document management application 324 to set the archived flag. Then, the present flow chart is ended.

FIG. 6 illustrates an example in which image data for archive is generated and recorded in a case where the scan function is executed. However, image data for archive may be generated from the received image data and recorded also in a case where other functions of the image processing apparatus 101 are executed, for example, in a case where the image data received from the PC client 102 is printed.

Figure 7:
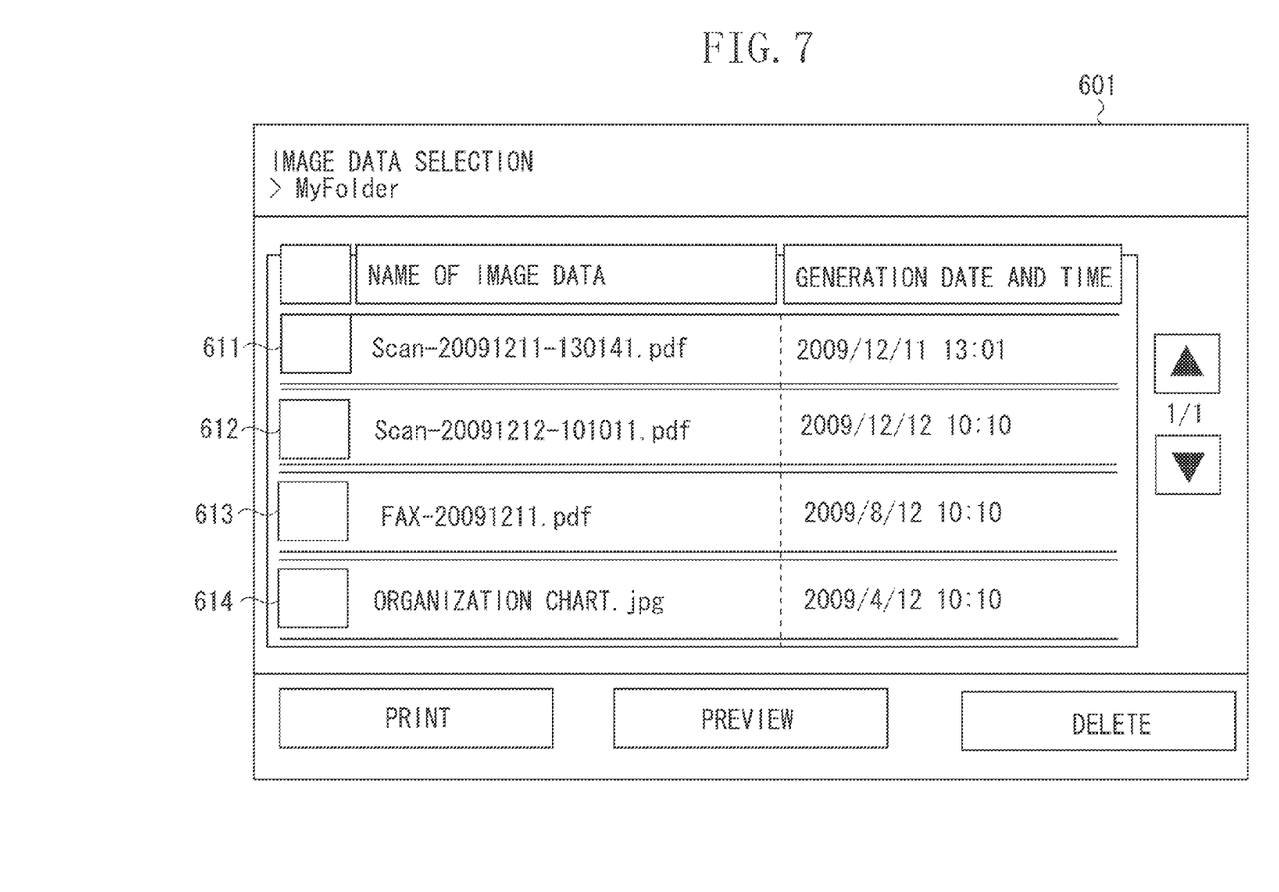
FIG. 7 illustrates a user interface (UI) displayed on the operation unit illustrated in FIG. 1.

FIG. 7 is a diagram illustrating an example of a user interface (operation screen) displayed on the operation unit 205 illustrated in FIG. 1. The example illustrates an operation screen related to the print application 325 of the image processing apparatus 101 illustrated in FIG. 3.

In FIG. 7, image data displays 611 to 614 illustrate image data stored in the document management application 324. All image data stored in the memory 209 by the document management application 324 are displayed herein.

The user can designate only "print" to be executed by the print application 325 on the operation screen illustrated in FIG. 7. For a print job, the archive application 327 is notified of the image data printed at the time of executing print.

This archives even the image data which are not archived when image data is stored in the memory 209 in a case where the image data is printed by the image processing apparatus 101.

The example illustrated in FIG. 5 is a display screen in a case where the PC client 102 makes reference to the image processing apparatus 101 in relation to image data. Because the document management application 324 is accessed from the outside of the image processing apparatus 101, only the image data set by the archived flag is displayed.

For example, "FAX-20091211.pdf" (image data 613) illustrated in FIG. 7 and "organization chart.jpg" (image data 614) are not displayed in FIG. 5.

Such image data is not image data from the scan operation illustrated in FIG. 6, but the copy of image data from the external PC client 102 to the memory 209 or writing of image data from the FAX reception application 322. Also in a case where the image data stored in a detachable storage medium (a USB memory and the like) is copied to the memory 209, the image data is not displayed in FIG. 5.

When such image data is stored in the memory 209, image data for archive is neither generated nor recorded. For this reason, the archive application 327 does not set the archived flag to such image data.

Therefore, if such image data is released to an apparatus such as the external PC client 102, the image data is unwillingly transmitted to the PC client 102 by operating the file copy. Also at this point, the image data is not archived. The image data thus input and output via the image processing apparatus 101 cannot be archived.

Therefore, in the present exemplary embodiment, the image data to be archived input via an image input processing such as a scan job, in other words, the archived image data can be accessed by the PC client 102.

In the present exemplary embodiment, the image data yet to be archived cannot be accessed by the PC client 102. Thereby, the image data not archived can be prevented from being output from the image processing apparatus 101.

Figure 8:
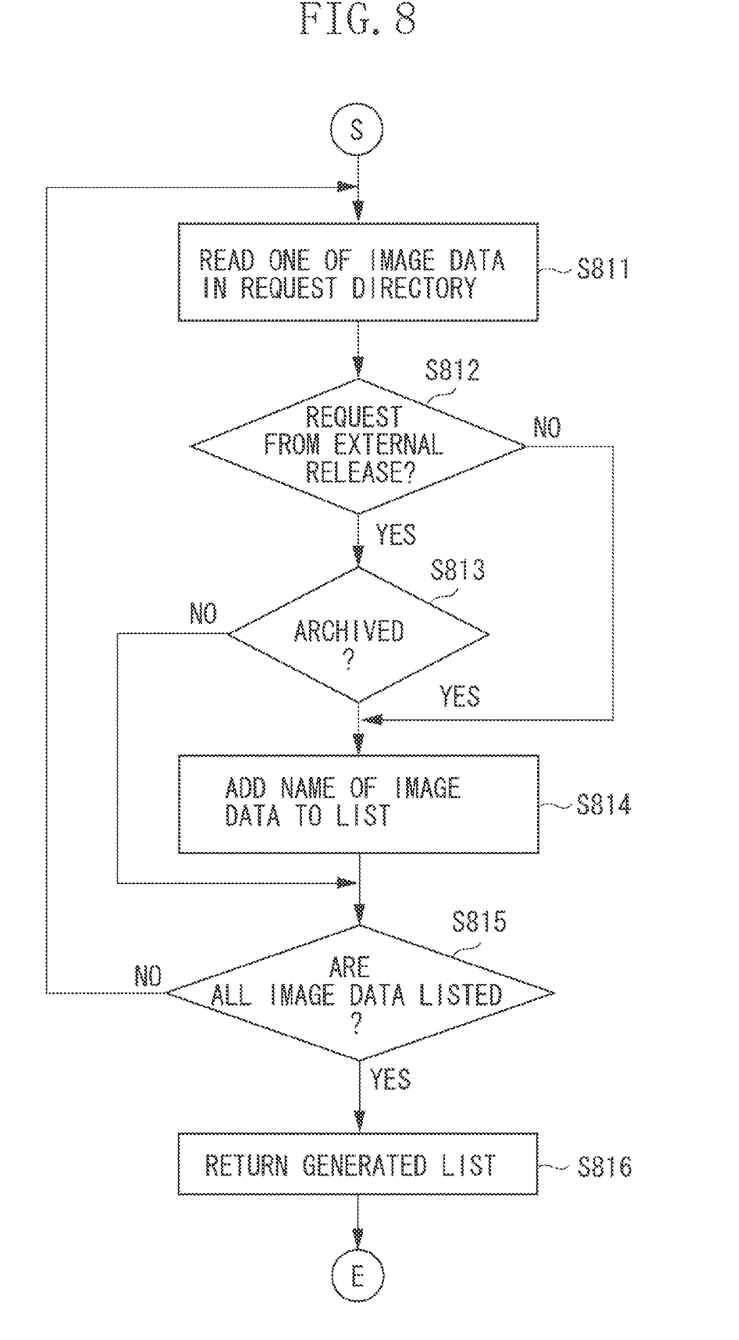
FIG. 8 is a flow chart illustrating a control procedure of the image processing apparatus.

FIG. 8 is a flow chart illustrating a control procedure of the image processing apparatus 101 according to the present exemplary embodiment.

The flow chart is an example where the document management application 324 generates an image data list when the print application 325 or the file sharing application 326 requests the document management application 324 to generate the image data list. Each step is realized by the CPU 202 loading the control program to the RAM 203 and executing the control program.

The generation processing of the image data list is the one that is executed when the document management application 324 displays the image data lists illustrated in FIGS. 5 and 7.

In step S811, the document management application 324 operating on the controller unit 201 reads one of pieces of image data information of the directory to be requested to be accessed by the print application 325 or the file sharing application 326.

In step S812, the document management application 324 determines whether the generation processing of the image data list is requested from the file sharing application 326.

If the document management application 324 determines that the generation processing is requested from the file sharing application 326 (YES in step S812), in step S813, the document management application 324 determines whether the archived flag indicates that image data is already "archived." The phrase "from the file sharing application 326" refers to a request for access "from outside," i.e., "from the PC client 102," for example.

If the document management application 324 determines that the archived flag indicates that image data is not yet "archived" (NO in step S813), the processing proceeds to step S815. In other words, if the document management application 324 determines that the archived flag indicates that image data is not yet archived, the name of one of the read image data is skipped and the processing proceeds to step S815.

If the document management application 324 determines that the archived flag indicates that image data is already "archived" (YES in step S813), the processing proceeds to step S814. In step S814, the document management application 324 operating on the controller unit 201 adds the name of image data that is being processed to the image data list.

In step S815, the document management application 324 operating on the controller unit 201 determines whether all image data are processed with respect to the directory. If the document management application 324 determines that the processing for all image data has not been processed (NO in step S815), the processing returns to step S811. If the document management application 324 determines that the processing for all image data has been finished (YES in step S815), the processing proceeds to step S816.

In step S816, the document management application 324 operating on the controller unit 201 notifies the print application 325 and the file sharing application 326 that make a request for processing the generated image data list. The present processing is ended.

Figure 9:
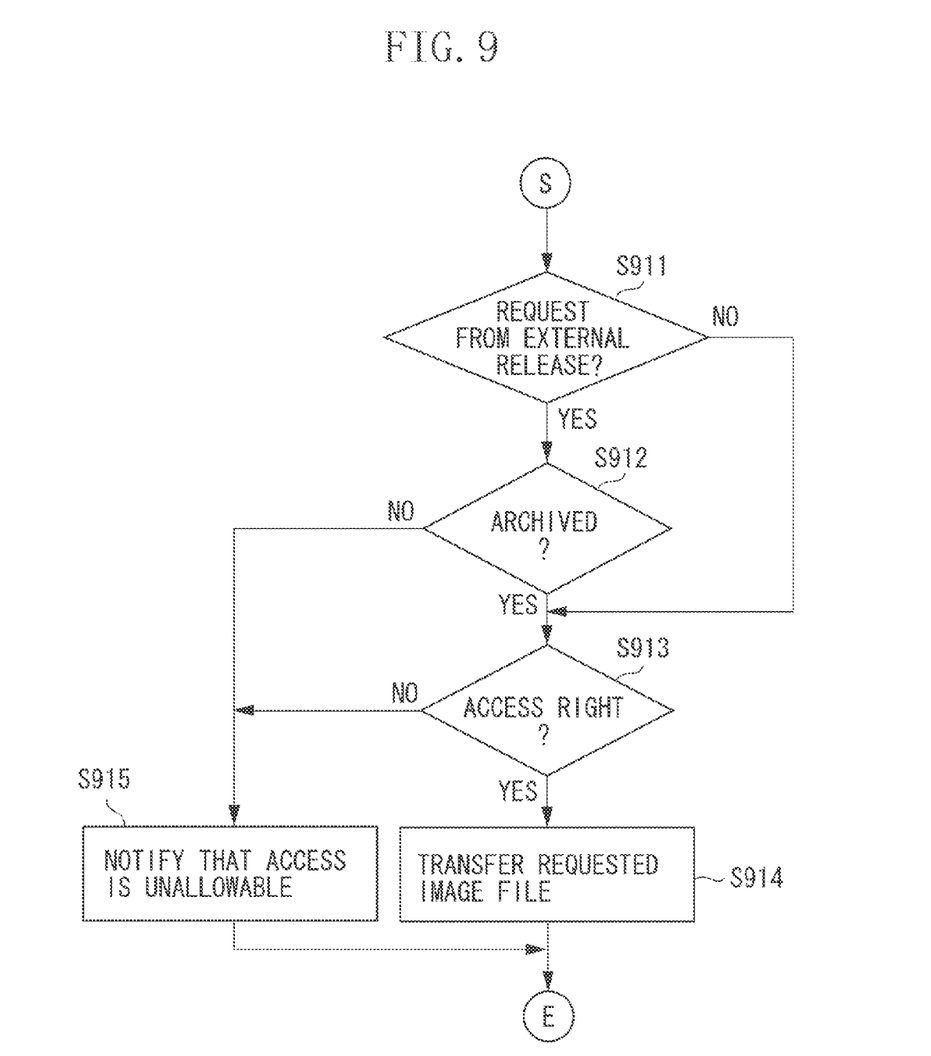
FIG. 9 is a flow chart illustrating a control procedure of the image processing apparatus.

FIG. 9 is a flow chart illustrating a control procedure of the image processing apparatus according to the present exemplary embodiment. The flow chart is an example where the document management application 324 in the image processing apparatus 101 reads image data from the print application 325 or the file sharing application 326. Each step can be realized by the CPU 202 loading the control program to the RAM 203 and executing the control program.

The image data reading process is used when the document management application 324 prints selection image data after displaying the operation screen illustrated in FIG. 7 or image data is opened from the PC client 102 in FIG. 5.

In step S911, the document management application 324 operating on the controller unit 201 determines whether the image data reading process is requested from the file sharing application 326. The phrase "from the file sharing application 326" refers to a request for access "from outside," i.e., "from the PC client 102," for example.

If the document management application 324 determines that the image data reading process is requested from the file sharing application 326 (YES in step S911), in step S912, the document management application 324 determines whether the archived flag indicates that image data has been already "archived." If the document management application 324 determines that the archived flag indicates that image data has not been "archived" (NO in step S912), the processing proceeds to step S915.

If the document management application 324 determines that the archived flag is set (YES in step S912), the processing proceeds to step S913.

In step S913, the document management application 324 confirms whether the user who makes the request has an access right to the image data. If the document management application 324 determines that the user has the access right (YES in step S913), the processing proceeds to step S914. If the document management application 324 determines that the user does not have the access right (NO in step S913), the processing proceeds to step S915.

In step S914, the document management application 324 transfers the image data to the print application 325 or the file sharing application 326 that requests the process. The present processing is ended.

In step S915, the document management application 324 notifies the print application 325 or the file sharing application 326 requesting the process of the image data that access is not allowed. Then, the present processing is ended.

According to the present exemplary embodiment, even in a case where all image data input and output in the image processing apparatus 101 are not to be stored (archived) for the purpose of audit, audit miss can be avoided by preventing the image data not archived from being output from the image processing apparatus 101 as it is.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable medium may store a program that causes an image processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-228302 filed Oct. 8, 2010, which is hereby incorporated by reference herein in its entirety.

What is claimed is:

1. An image processing apparatus comprising:
a storage unit configured to be managed to allow access from an external information processing apparatus;
a generation unit configured to generate image data for audit for auditing the image data later, wherein the image data is generated by a reading unit reading a document or is input;
a recording unit configured to record the image data for audit generated by the generation unit;
a sharing unit configured to share the image data stored in the storage unit with the external information processing apparatus;
a printing unit configured to print the image data stored in the storage unit; and
a control unit configured to restrict the sharing unit from sharing image data not corresponding to image data for audit recorded by the recording unit with the external information processing apparatus, and permit the printing unit to print the image data not corresponding to image data for audit recorded by the recording unit with the external information processing apparatus.

2. The image processing apparatus according to claim 1, further comprising a display unit configured to display a list of the image data stored in the storage unit,
wherein the display unit displays information about the image data in which the image data for audit is recorded by the recording unit and the image data in which the image data for audit is not recorded by the recording unit.

3. The image processing apparatus according to claim 1, wherein a transmission unit transmits information about the image data to the external information processing apparatus using a service message block (SMB) or a distributed authoring and versioning protocol for the World Wide Web (WWW) (Web-based Distributed Authoring and Versioning (WebDAV)).

4. A method for controlling an image processing apparatus including a storage unit configured to be managed to allow access from an external information processing apparatus, the method comprising:
generating image data for audit for auditing the image data later, wherein the image data is generated by a reading unit reading a document or is input;
recording, in a recording unit, the generated image data for audit;
sharing the image data stored in the storage unit with the external information processing apparatus;
printing the image data stored in the storage unit; and
restricting sharing of image data not corresponding to image data for audit recorded by the recording unit with the external information processing apparatus, and permitting printing of the image data not corresponding to image data for audit recorded by the recording unit with the external information processing apparatus.

5. A non-transitory computer-readable storage medium storing a program that causes an image processing apparatus to perform the method according to claim 4.

* * * * *